(12) United States Patent
Rachwalski et al.

(10) Patent No.: US 7,612,671 B2
(45) Date of Patent: Nov. 3, 2009

(54) ATTACHMENT DEVICE, ATTACHMENT RECEIVING DEVICE AND SYSTEM FOR IDENTIFYING SECURED CONTAINERS

(75) Inventors: Richard S. Rachwalski, Lemont, IL (US); Nicholas C. Hopman, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 151 days.

(21) Appl. No.: 11/564,425

(22) Filed: Nov. 29, 2006

(65) Prior Publication Data
US 2008/0122620 A1 May 29, 2008

(51) Int. Cl.
*G08B 23/00* (2006.01)
(52) U.S. Cl. ............... 340/572.1; 340/572.3; 340/571; 340/572.4; 340/568.1; 340/572.8; 235/492; 292/318; 333/1.1; 333/24.2
(58) Field of Classification Search ............ 340/572.1, 340/572.3, 573, 571, 568.1, 540, 5.2, 572.4, 340/572.8; 235/492; 292/318; 333/1.1, 333/24.2
See application file for complete search history.

(56) References Cited

U.S. PATENT DOCUMENTS

| | | | |
|---|---|---|---|
| 5,125,700 A * | 6/1992 | Fattori et al. | ................ 292/318 |
| 6,246,327 B1 | 6/2001 | Eberhardt | |
| 6,265,973 B1 | 7/2001 | Brammall et al. | |
| 6,407,666 B1 | 6/2002 | Debrody et al. | |
| 6,753,775 B2 | 6/2004 | Auerbach et al. | |
| 2004/0100359 A1 * | 5/2004 | Reade et al. | ................ 340/5.2 |
| 2005/0231365 A1 | 10/2005 | Tester et al. | |
| 2005/0263602 A1 | 12/2005 | Lin et al. | |
| 2006/0232408 A1 | 10/2006 | Nycz et al. | |

OTHER PUBLICATIONS

International Search Report Dated Apr. 10, 2008.
U.S. Appl. No. 11/304,290, filed Dec. 15, 2005, Nicholas C. Hopman.
Atmel Corporation "128-bit Read-only IDIC for RF Identification e5530", Specification, 2002, 8 pages.
American Casting & Manufacturing Corp. "Model: BLT-1 Heavy Duty Bolt Lock", Specification, 2003, 1 page.

* cited by examiner

*Primary Examiner*—Benjamin C Lee
*Assistant Examiner*—Sisay Yacob
(74) *Attorney, Agent, or Firm*—Ronald E. Prass, Jr.; Prass LLP

(57) ABSTRACT

An attachment device, attachment receiving device and system for identifying a secured container are disclosed. The system may include an attachment device, a first identification device embedded into the attachment device, the first identification device containing identification data relating to the attachment device, an attachment receiving device coupled to a container, a second identification device embedded into the attachment receiving device, the second identification device containing identification data relating to the container, wherein when the attachment device is attached to the attachment receiving device, the attachment device identification data and the container identification data are associated, and the associated identification data is capable of being read by an identification data reader.

16 Claims, 7 Drawing Sheets

ATTACHMENT DEVICE, ATTACHMENT RECEIVING DEVICE AND SYSTEM FOR IDENTIFYING SECURED CONTAINERS

BACKGROUND OF THE INVENTION

1. Field of the Invention

The present invention relates to identifying secured containers for inventory and integrity monitoring purposes.

2. Introduction

To address heightened security concerns, governmental agencies require means to seal intermodal cargo containers and determine whether the seal has been compromised during transport. One conventional container-sealing solution is a bolt lock. Once locked, the bolt must be cut to break the seal. The bolt can be stamped with an identification number. This simple solution is inadequate because a cut seal can be replaced with one that is easily forged with the same identification number. Also, this solution is not compatible with automation.

Another conventional solution involves using a modified bolt lock in conjunction with an active radio frequency identification (RFID) tag. The bolt slides through the door lock and into a housing containing the tag electronics and bolt-sensing circuitry. The bolt has an insulating layer with an outer conductive layer that electrically connects to the bolt steel at the exposed end only. This design presents a short circuit to the sensing circuitry when the bolt is intact and an open circuit when it is cut at the exposed end. When the open-circuit condition is detected, the electronics records the event and an alert is transmitted the next time the seal is interrogated by an RFID reader. A second RFID tag is used to identify the container. Association between the container and the seal is made at the system level.

Although this solution accommodates automation, it requires two active tags per container, which presents an undesirable cost issue. In addition, the seal mechanism can be overridden by artificially creating a short across the contacts to the bolt-sensing circuitry prior to cutting the bolt.

SUMMARY OF THE INVENTION

An attachment device, attachment receiving device and system for identifying a secured container are disclosed. The system may include an attachment device, a first identification device embedded into the attachment device, the first identification device containing identification data relating to the attachment device, an attachment receiving device coupled to a container, a second identification device embedded into the attachment receiving device, the second identification device containing identification data relating to the container, wherein when the attachment device is attached to the attachment receiving device, the attachment device identification data and the container identification data are associated, and the associated identification data is capable of being read by an identification data reader.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as an attachment device, an attachment receiving device and system and other embodiments that relate to the basic concepts of the invention.

The invention concerns a container identification system. The system is designed to monitor the integrity status of sealed containers and their respective securing attachment devices such that if the security of one of the containers is breeched, the system can identify the breeched container.

Figure 1:
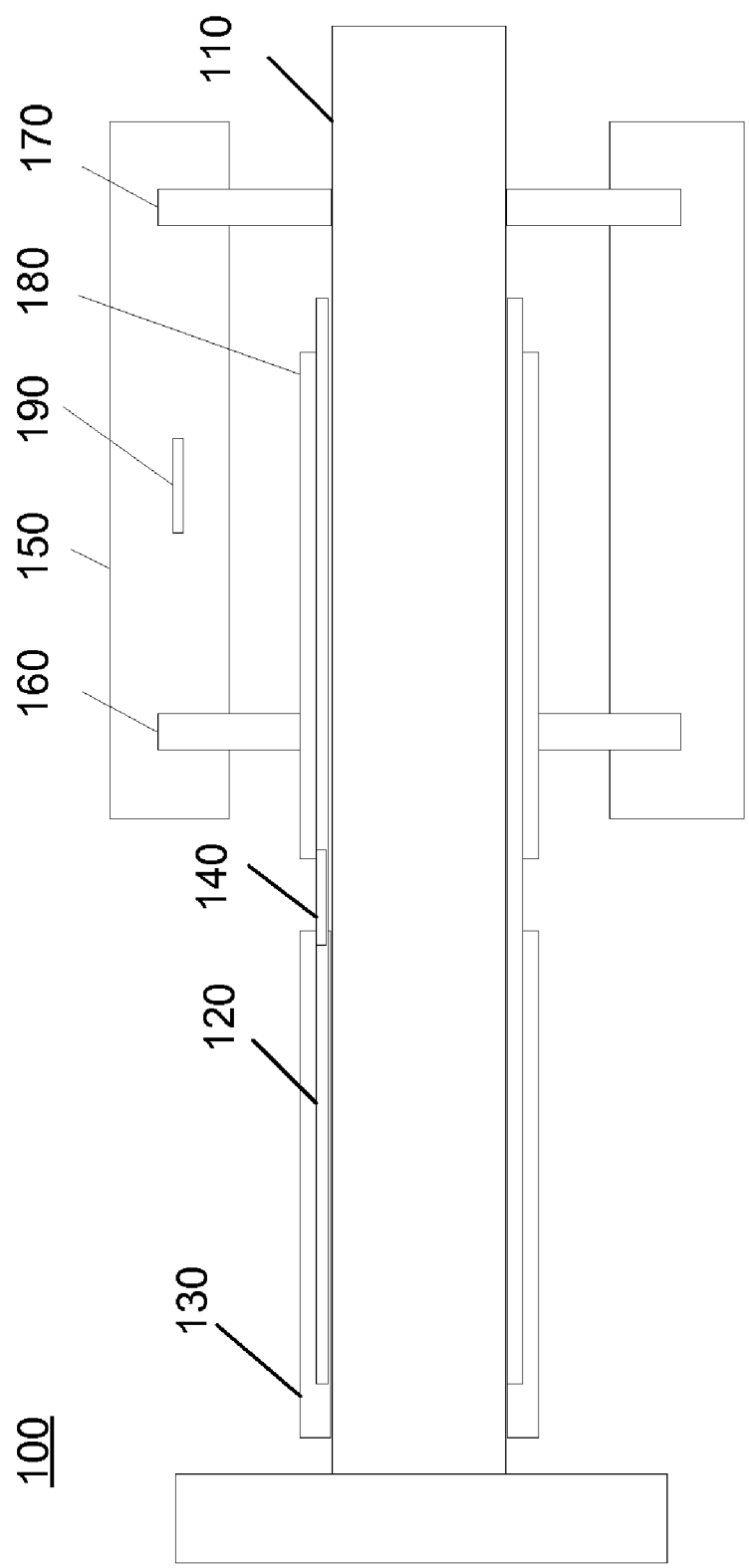
FIG. 1 illustrates an exemplary diagram of a container identification system in accordance with a possible embodiment of the invention.

FIG. 1 illustrates an exemplary diagram of a container identification system 100 in accordance with a possible embodiment of the invention. In particular, the container identification system 100, shown as a cross-sectional view, includes an attachment device 110 which may be wrapped with an electrical insulator 120 and coated with an electrically conductive layer 130, 180. In one possible embodiment, the electrical insulator 120 and conductive layer 130, 180 may be applied as conductive paint, for example, and the body of the attachment device 110 may be formed from an electrically conductive material, such as hardened steel, for example.

While FIG. 1 shows a bolt as an example attachment device 110, one of skill in the art would recognize that any device suitable for attaching to and securing a container may be used, such as a nail, a metal rod, a lock, etc.

An identification device 140, such as a radio frequency identification (RFID) tag, device or chip, is attached to (embedded into) the bolt 110. The identification device 140 contains (stores) identification data relating the attachment device 110, such as a serial number, etc. and may be an active or passive device.

The attachment device 110 is intended to be placed into an attachment receiving device 150 with electrical contact points 160, 170, such as contact rings. While contact rings are shown as the electrical contact points 160, 170 in FIG. 1, one of skill in the art will recognize that other contact mechanisms or housings may be used as long as an electrical connection results, such as a latch, clamp, lock, washer, nut, etc.

The attachment receiving device 150 may be attached (connected/coupled) to a container or other storage compartment. Another identification device 190 may be embedded into or connected electrically in a manner known to those of skill in the art to the attachment receiving device 150 and/or its assembly, for example. Although identification device 190 is shown to be embedded into the attachment receiving device 150, the identification device 190 may be associated, placed or embedded in manner to the attachment receiving device 150. The identification device 190 may contain identification information relating to the container to which it is attached and may be an active or passive device, as well as other information and/or data, for example.

The identification device 140 and the identification device 190 associated with the attachment receiving device 150 may both be active devices. However, as a practical matter, since passive identification devices are generally less expensive than active identification devices, one of the identification devices may be passive and the other one may be active. Since the attachment device 110 may be severed upon reaching its destination and the attachment receiving device 190 likely to remain in tact, the identification device 140 may be the less expensive passive device and the identification device 190 associated with the attachment receiving device 150 may the active device, for example.

The conductive layer 130, 180 serves to permit electrical coupling throughout the attachment device 110. The conductive layer 130 may contact the neck of the attachment device 110, portions of the identification device 140, and at least one electrical contact point 160, 170 on the attachment receiving device 150. As shown, an electrical current path exists between electrical contact points 160 and 170, through conductive layer 180, identification device 140, conductive layer 130, and attachment device 110. In this manner, if the attachment device 110 is severed in any manner, the electrical conductivity between electrical contact points 160 and 170 is broken indicating that the security of the container the attachment device 110 may be attached to may have been breached.

For illustrative purposes, the container identification process will be described below in relation to the diagram shown in FIG. 1.

Figure 2:
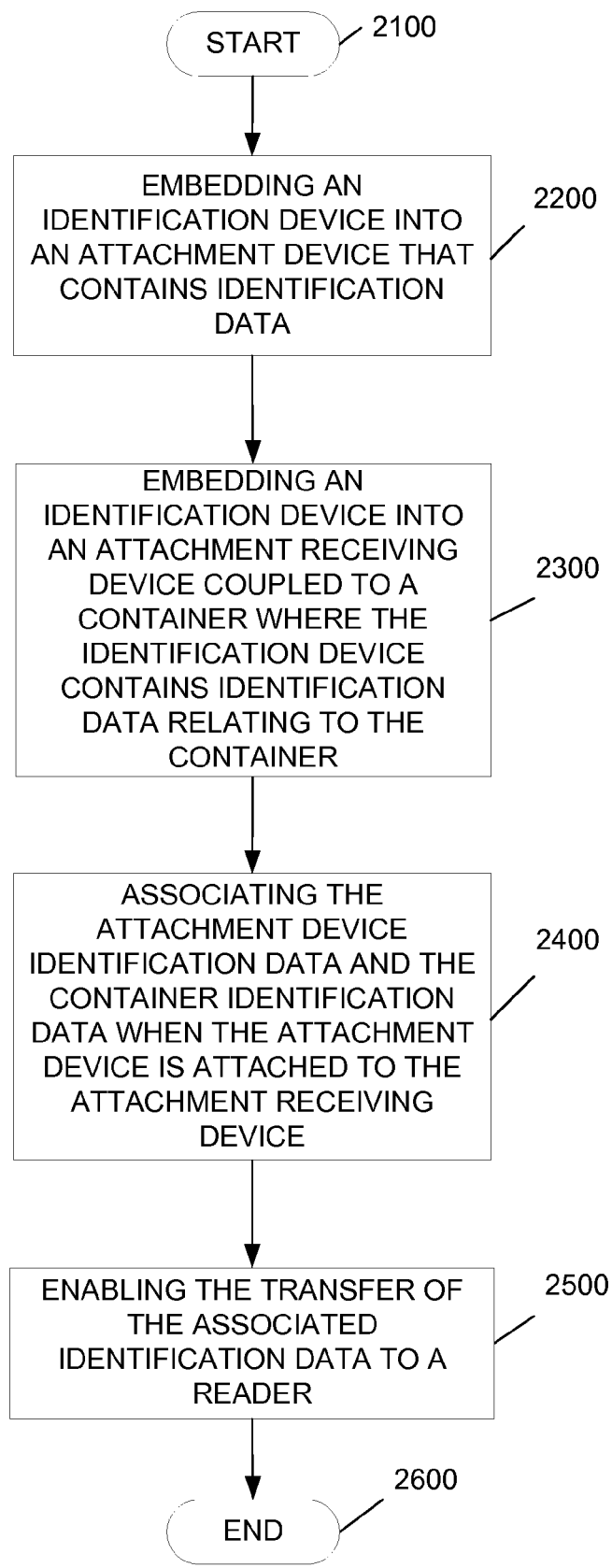
FIG. 2 illustrates an exemplary flowchart illustrating one possible container identification process in accordance with a possible embodiment of the invention.

FIG. 2 is an exemplary flowchart illustrating some of the basic steps associated with a container identification process in accordance with a possible embodiment of the invention. The process begins at step 2100 and continues to step 2200 where an identification device 140 is embedded into the attachment device 110. The identification device 140 contains identification information relating to the attachment device 110. At step 2300, a second identification device 190 is embedded into the attachment receiving device 150 which is attached to a container. The second identification device 190 may contain identification data relating to the container.

At step 2400, if the attachment device 110 is attached to the attachment receiving device 150, the attachment device identification data and the container identification data are associated and/or combined. At step 2500, the transfer of the associated identification data to an identification data reader is enabled. Therefore, when the associated identification data is read by an identification data reader, the attachment device is automatically associated with the container it is securing. The process goes to step 2600 and ends.

Figure 3:
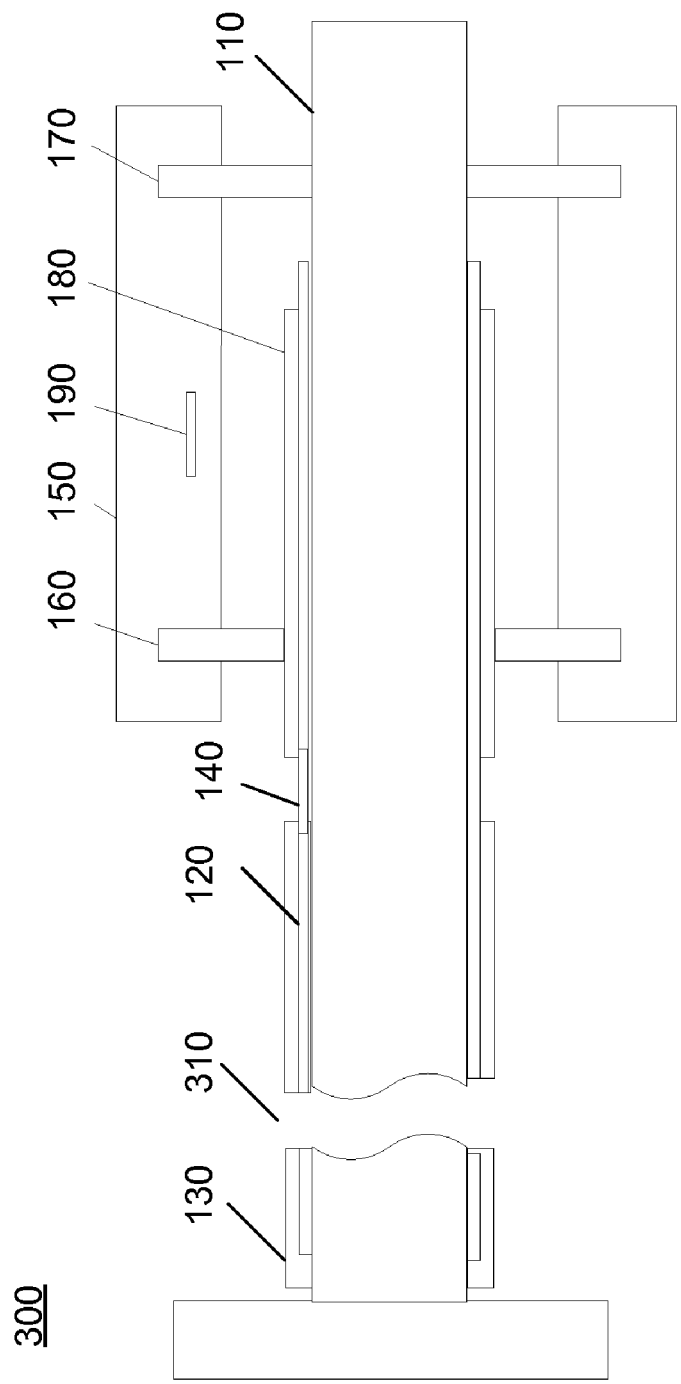
FIG. 3 illustrates a block diagram of an exemplary container identification system illustrating a broken seal condition in accordance with a possible embodiment of the invention.

FIG. 3 shows an exemplary diagram of a container identification system 300 with the attachment device 110 of FIG. 1 illustrating as possible condition in which the attachment device is opened, removed, severed, disturbed, tampered with, etc. For exemplary purposes, FIG. 3 illustrates the same elements as in FIG. 1 but with a break 310 in the attachment device 110. The break 310 disturbs the electrical connectivity to identification device 140 from electrical contact points 160, 170 provided by the conductive layer 130, 180 such that if the attachment device 110 is interrogated by an identification data reader, the reader will be able to determine that the integrity of the attachment device 110 has been compromised. The identification device 140 in the attachment device 110 may also operate (if it is an active device) to alert an identification data reader directly upon a breach, or if the identification device 190 located in the attachment receiving device 150 senses that a connection with the attachment device 110 no longer exist, attachment receiving device's 150 identification device can send the alert.

Figure 4:
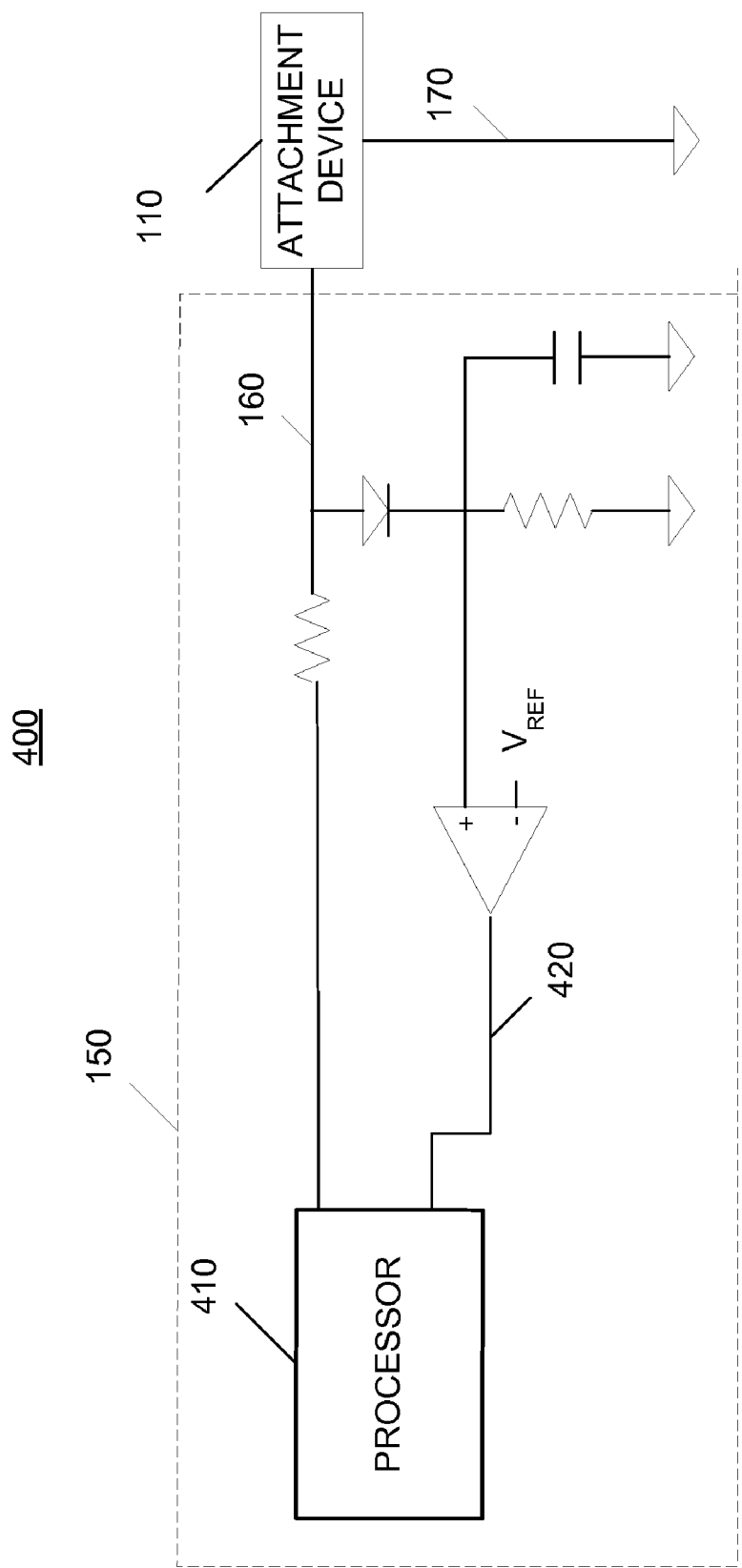
FIG. 4 illustrates an exemplary schematic diagram of a portion of possible components of an attachment receiving device in accordance with a possible embodiment of the invention.

FIG. 4 illustrates an exemplary diagram 400 illustrating a portion of possible components of the attachment receiving device 150 that may be used to permit the transfer of information from the attachment device 110 to the attachment receiving device 150 and subsequently to an external or internal reader device. The attachment receiving device 150 may includes a processor 410 as electrically connected to the attachment device 110 through the electrical contact points 160, 170 of the container identification system 100 shown in FIGS. 1 and 3. The processor 410 may be connected to logic circuitry such that if it sends out an excitation signal (125 kHz, for example) and if the attachment device 110 is intact, identification device 140 residing on attachment device 110 will modulate the amplitude and/or phase of the excitation signal with its identification information as observed at electrical contact point 160. The logic signal on the return loop 420 will contain the associated identification data for recovery by the identification data reader.

If the attachment device 110 is removed, for example, the logic signal on the return loop 420 will not contain valid identification information and associated identification data is not received by the attachment receiving device 150. This indicates to the attachment receiving device 150 that there is an integrity problem with the attachment device 110 and/or the container associated with that attachment device 110. Thus, the container integrity problem may be easily identified and communicated to a reader device, an inventory control system, or other container inspection system.

The attachment receiving device 150 may identify the integrity problem upon interrogation of each container's associated identification data. Alternatively, the circuitry may be configured so that or other monitoring system is notified immediately if there is a container integrity problem.

Figure 5:
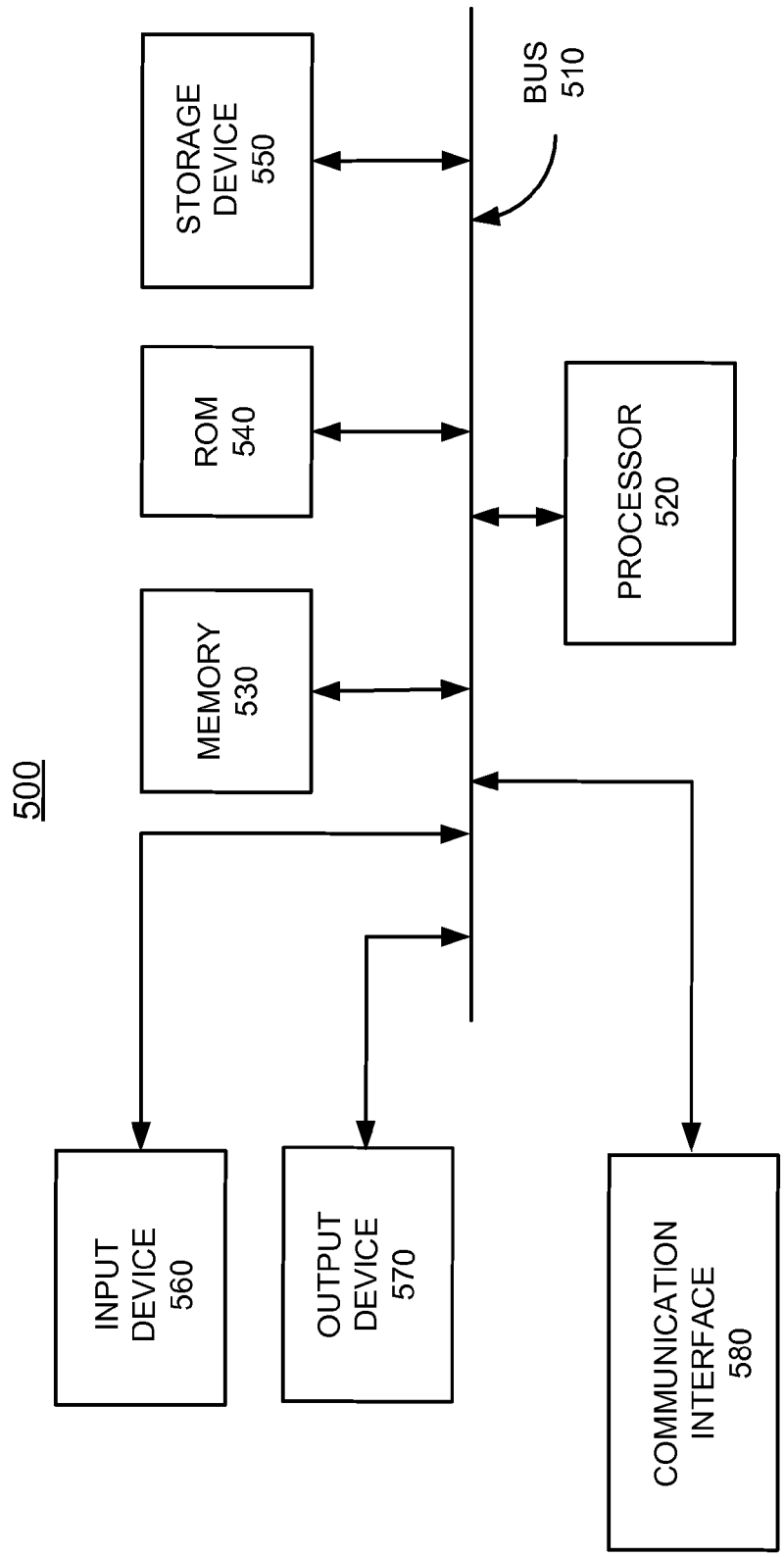
FIG. 5 illustrates an exemplary block diagram of a device for implementing the identification reading process in accordance with a possible embodiment of the invention.

FIG. 5 illustrates an exemplary identification data reader 500, or device which may implement one or more modules or functions of the identification data reading process shown in FIG. 4. The identification data reader 500 may communicate wirelessly or a wired manner with the identification device 190 in the attachment receiving device 150 and/or the identification device 140 in the attachment device 110. The exemplary identification data reader 500 may include a bus 510, a processor 520, a memory 530, a read only memory (ROM) 540, a storage device 550, input device 560, output device 570 and a communication interface 580. Bus 510 may permit communication among the components of the container identification system 100, 400.

Processor 520 may include at least one conventional processor or microprocessor that interprets and executes instructions. Memory 530 may be a random access memory (RAM) or another type of dynamic storage device that stores information and instructions for execution by processor 520. Memory 530 may also store temporary variables or other intermediate information used during execution of instructions by processor 520. ROM 540 may include a conventional ROM device or another type of static storage device that stores static information and instructions for processor 520. Storage device 550 may include any type of media, such as, for example, magnetic or optical recording media and its corresponding drive.

Input device 560 may include one or more conventional mechanisms that permit a user to input information to the identification data reader 410, such as a keyboard, a mouse, a pen, a voice recognition device, etc. The output device 570 may include one or more conventional mechanisms that output information to the user, including a display, a printer, one or more speakers, or a medium, such as a memory, or a magnetic or optical disk and a corresponding disk drive.

Communication interface 580 may include any transceiver-like mechanism that enables the identification data reader 500 to communicate wirelessly or a wired manner with the identification device 190 in the attachment receiving device 150 and/or the identification device 140 in the attachment device 110, as well as to other devices communicate via a network, directly or otherwise. For example, communication interface 580 may include a modem, or an Ethernet interface for communicating via a local area network (LAN). Alternatively, communication interface 580 may include other mechanisms for communicating with other devices and/or systems via wired, wireless or optical connections. In some implementations of the container identification system 100, 400, communication interface 580 may not be included in the exemplary identification data reader 500 when the identification data reading process is implemented completely within the identification data reader 500.

The identification data reader 500 may perform such functions in response to processor 520 by executing sequences of instructions contained in a computer-readable medium, such as, for example, memory 530, a magnetic disk, or an optical disk. Such instructions may be read into memory 530 from another computer-readable medium, such as storage device 550, or from a separate device via communication interface 570.

The container identification system 100, and the identification data reader 500 illustrated in FIGS. 1 and 5 and the related discussion are intended to provide a brief, general description of a suitable computing environment in which the invention may be implemented. Although not required, the invention will be described, at least in part, in the general context of computer-executable instructions, such as program modules, being executed by the identification data reader 500, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 6:
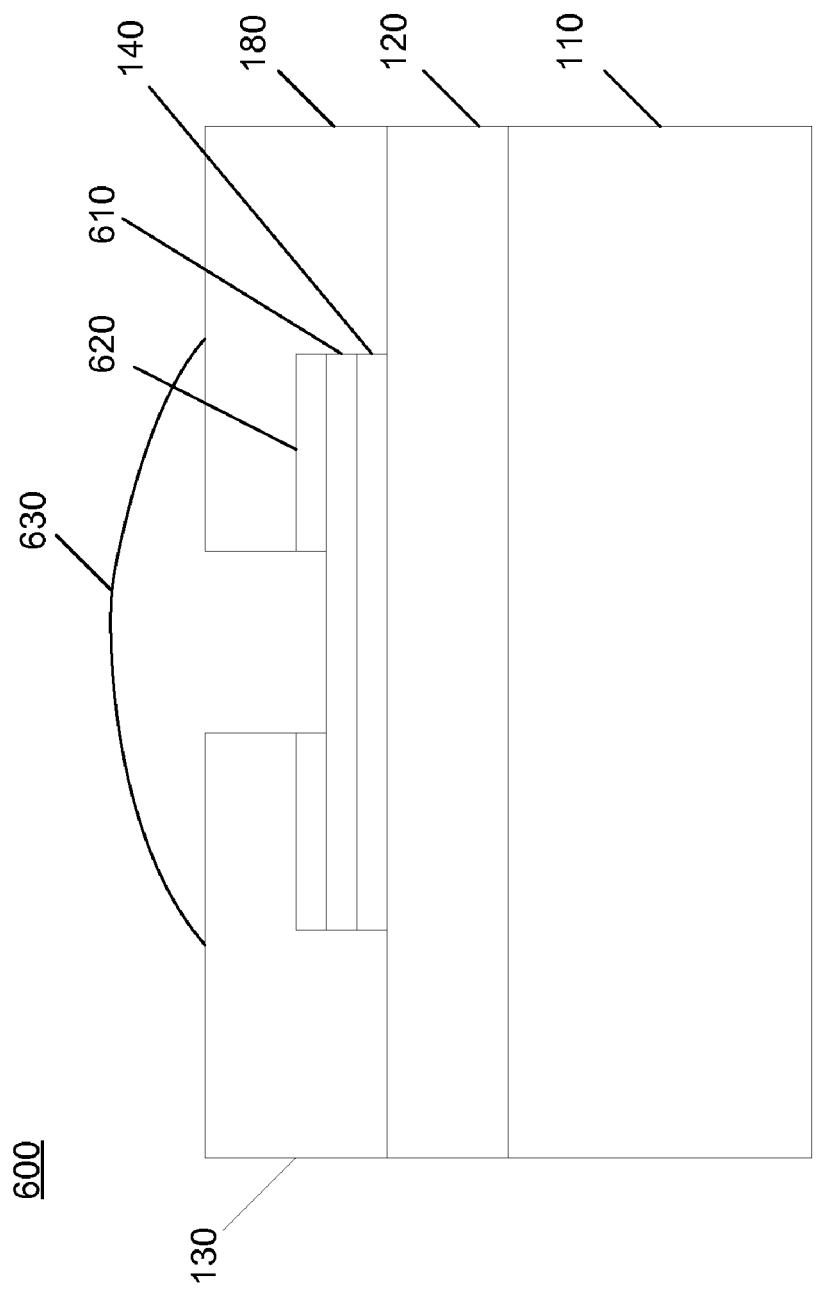
FIG. 6 is an exemplary diagram illustrating a possible configuration in which an identification device may be attached to an attachment device in accordance with a possible embodiment of the invention.
Figure 7:
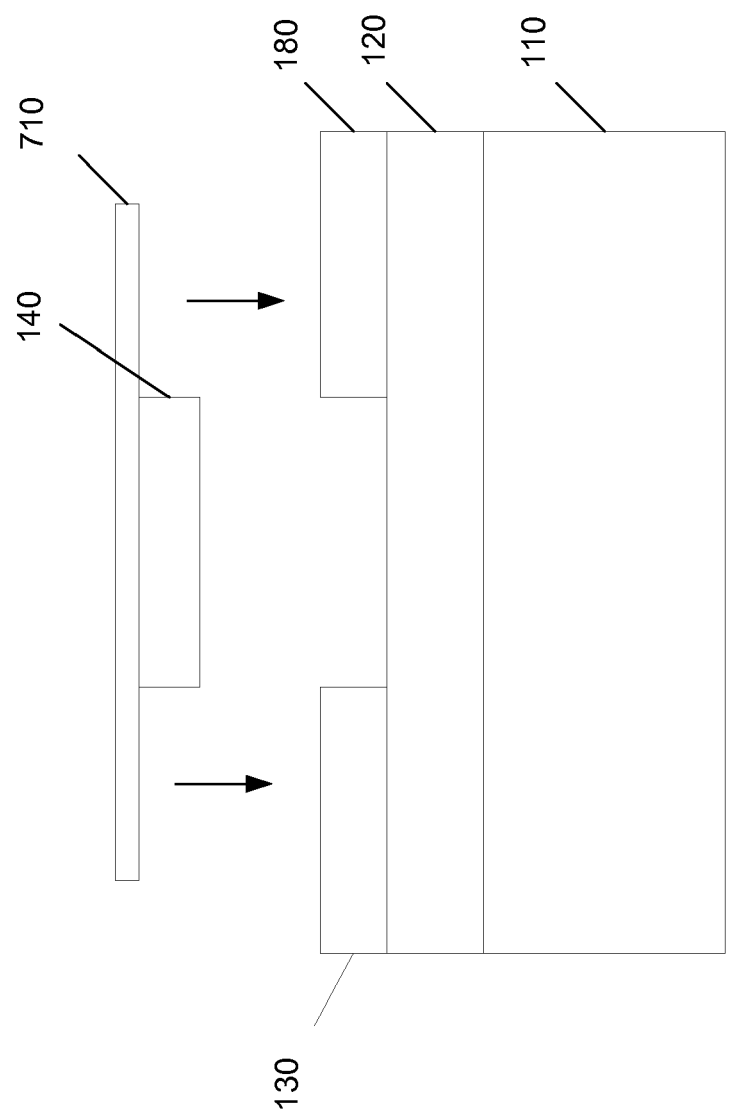
FIG. 7 is an exemplary diagram illustrating another possible configuration in which an identification device is attached to an attachment device in accordance with a possible embodiment of the invention.

FIGS. 6 and 7 are exemplary diagrams showing possible alternative configurations in which the identification device 140 may be attached to or embedded into the attachment device 110. In these diagrams, only a small cross sectional portion of the attachment device is shown. In container identification system 600 shown in FIG. 6, the attachment device 110 may be wrapped in insulation 120 as in FIGS. 1 and 3. The identification device 140 may be attached above the insulation 120 and below a screened electrical insulator 610. Screened electrically conductive pads 620 may be placed on top of the screen insulator 610 which make electrical connection with the terminals of identification device 140 through openings in the screened insulator 610 (not shown).

Attachment device 110 may be coated with conductive layer 130, 180 to make electrical connections to the screened pads 620. The identification device 140 maintains contact with the conductive layer 130. The area where the identification device is place may be coated with a hermetic seal 630 to help maintain system integrity. It will be obvious to those skilled in the art that the screened insulator 610 and pads 620 may be omitted so that the conductive layer 130, 180 makes direct contact with the terminals of identification device 140.

In container identification system 700 shown in FIG. 7, the attachment device 110 may be wrapped in insulation 120 and coated with conductive layer 130, 180 as in FIGS. 1, 3 and 6. The identification device 140 may be attached to an interposer assembly 710 which may comprise a substrate and electrically conductive pads (not shown) which make electrical connection with the terminals of the identification device 140. The interposer assembly 710 may be then attached to the conductive layer 130, 180 on top of the attachment device 110. The identification device 140 may fit inside a break in the conductive layer and may sit on top of or just above the insulation 120 and may or may not be directly in contact with the conductive layer 130, 180. The interposer assembly 710 and identification device 140 may further be protected by a hermetic seal (not shown).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the container identification system 100 in FIGS. 1 and 4 each processing the content in various possible ways. It does not necessarily need to be one system used by all end users. Accordingly, the appended claims and their legal equivalents should only define the invention, rather than any specific examples given.

We claim:

1. An attachment device used to secure a container, comprising:
    an attachment body member;
    a conductive coating covering at least a portion of the attachment body member; and
    a first identification device embedded into the attachment body member and in contact with the conductive coating, the first identification device containing attachment device identification data relating to the attachment device, wherein the attachment body member is configured to be inserted into an attachment receiving device, the attachment receiving device comprising an electrically conductive housing coupled to the container, a second identification device embedded into the attachment receiving device containing identification data relating to the container, and when the attachment device is inserted to the attachment receiving device, the attachment device identification data and the container identification data are associated and the associated identification data is capable of being read by an identification data reader, and if the attachment device is one of disturbed, severed, and disconnected as being detected via the conductive coating by the attachment receiving device, the attachment device identification data is not capable of being transferred to the identification data reader which serves as an indication that security of the container has been compromised.

2. The attachment device of claim 1, wherein the attachment body member is one of a bolt, a lock, and a metal rod.

3. The attachment device of claim 1, wherein the first identification device is one of a passive device and an active device.

4. The attachment device of claim 1, wherein the first identification device is a radio frequency identification (RFID) device.

5. The attachment device of claim 1, wherein the first identification device electronically transmits the identification data to the identification data reader.

6. A system that enables identification of a secured container, comprising:
    an attachment device; an electrically conductive coating covering at least a portion of the attachment device;
    a first identification device embedded into the attachment device, the first identification device containing identification data relating to the attachment device; an attachment receiving device coupled to the container, wherein the attachment receiving device comprises an electrically conductive housing and the attachment device is configured to be inserted into the electrically conductive housing; a second identification device embedded into the attachment receiving device, the second identification device containing identification data relating to the container, wherein when the attachment device is inserted to the attachment receiving device, the attachment device identification data and the container identification data are associated, and the associated identification data is capable of being read by an identification data reader, wherein if one of the attachment device, the attachment receiving device, and a connection between the attachment device and the attachment receiving device is one of disturbed, severed and disconnected as being detected via the conductive housing by the attachment receiving device, the associated identification data is not capable of being transferred to the identification data reader which serves as an indication that security of the container has been compromised.

7. The system of claim 6, wherein the identification data reader electronically reads and processes the transferred associated identification data.

8. The system of claim 6, wherein at least one of the first identification device and second identification device electronically transmits the associated identification data continuously to the identification data reader.

9. The system of claim 6, wherein at least one of the first identification device and second identification device electronically transmits the associated identification data when requested by the identification data reader.

10. The system of claim 6, wherein if one of the attachment device, the attachment receiving device, and a connection between the attachment device and the attachment receiving device are one of disturbed, severed, and disconnected, the identification data reader is alerted.

11. The system of claim 6, wherein the attachment device is one of a bolt, a lock, and a metal rod.

12. The system of claim 6, wherein one of the first identification device and second identification device is a passive device and the other of the first identification device and second identification device is an active device.

13. The system of claim 6, wherein at least one of the first identification device and second identification device is a radio frequency identification (RFID) device.

14. An attachment receiving device used to secure a container, comprising:
    an electrically conductive housing coupled to a the container; and
    an attachment receiving identification device embedded into the electrically conductive housing, the attachment receiving identification device containing identification data relating to the container, wherein the electrically conductive housing is configured to receive an attachment device; an electrically conductive coating covering at least a portion of the attachment device; the attachment device having an attachment device identification device embedded into the attachment device containing identification data relating to the attachment device, and when the attachment device is receive by the attachment receiving device, the attachment device identification data and the container identification data are associated and the associated identification data is capable of being read by an identification data reader, and if one of the attachment device, the attachment receiving device, and a connection between the attachment device and the attachment receiving device are one of disturbed, severed, and disconnected as being detected via the conductive housing by the attachment receiving device, the associated identification data is not capable of being transferred to the identification data reader which serves as an indication that security of the container has been compromised.

15. The attachment receiving device of claim 14, wherein the identification device is one of a passive and an active device.

16. The attachment receiving device of claim 14, wherein the identification device electronically transmits the identification data to the identification data reader.

* * * * *